United States Patent [19]
Mahler et al.

[11] 3,975,502

[45] Aug. 17, 1976

[54] PROCESS FOR RECOVERY OF HYDROGEN CYANIDE

[75] Inventors: Eddie G. Mahler, Beaumont; Patrick R. McAllister; Eugene D. Wilhoit, both of Victoria, all of Tex.

[73] Assignee: E. I. Du Pont de Nemours and Company, Wilmington, Del.

[22] Filed: July 13, 1973

[21] Appl. No.: 378,969

Related U.S. Application Data

[63] Continuation-in-part of Ser. No. 287,038, Sept. 7, 1972, abandoned.

[52] U.S. Cl............................. 423/372; 260/586 R; 423/236
[51] Int. Cl.²............................................ C01C 3/04
[58] Field of Search.................... 423/372, 236, 371; 260/586, 465.1; 55/68; 210/21

[56] References Cited
UNITED STATES PATENTS

| | | | |
|---|---|---|---|
| 1,520,726 | 12/1924 | Shaw | 423/236 |
| 3,544,268 | 12/1970 | Hess | 423/372 |
| 3,607,010 | 9/1971 | Brown | 423/371 |

*Primary Examiner*—L. Dewayne Rutledge
*Assistant Examiner*—Michael L. Lewis

[57] ABSTRACT

An improved process for recovery of hydrogen cyanide contained in a gaseous mixture is provided which comprises (a) contacting the gaseous mixture with an aqueous solution of an alkali metal carbonate to form an aqueous solution of the alkali metal cyanide and the corresponding bicarbonate, (b) contacting the aqueous solution of (a) with a ketone to produce a cyanohydrin-ketone mixture immiscible in the aqueous solution and a regenerate the alkali metal carbonate, separating the alkali metal carbonate solution and returning it to the gas absorption step (a) and recovering the cyanohydrinketone mixture. Alternately, the cyanohydrin in the cyanohydrin-ketone mixture of step (b) can be decomposed to the corresponding ketone and hydrogen cyanide.

7 Claims, 2 Drawing Figures

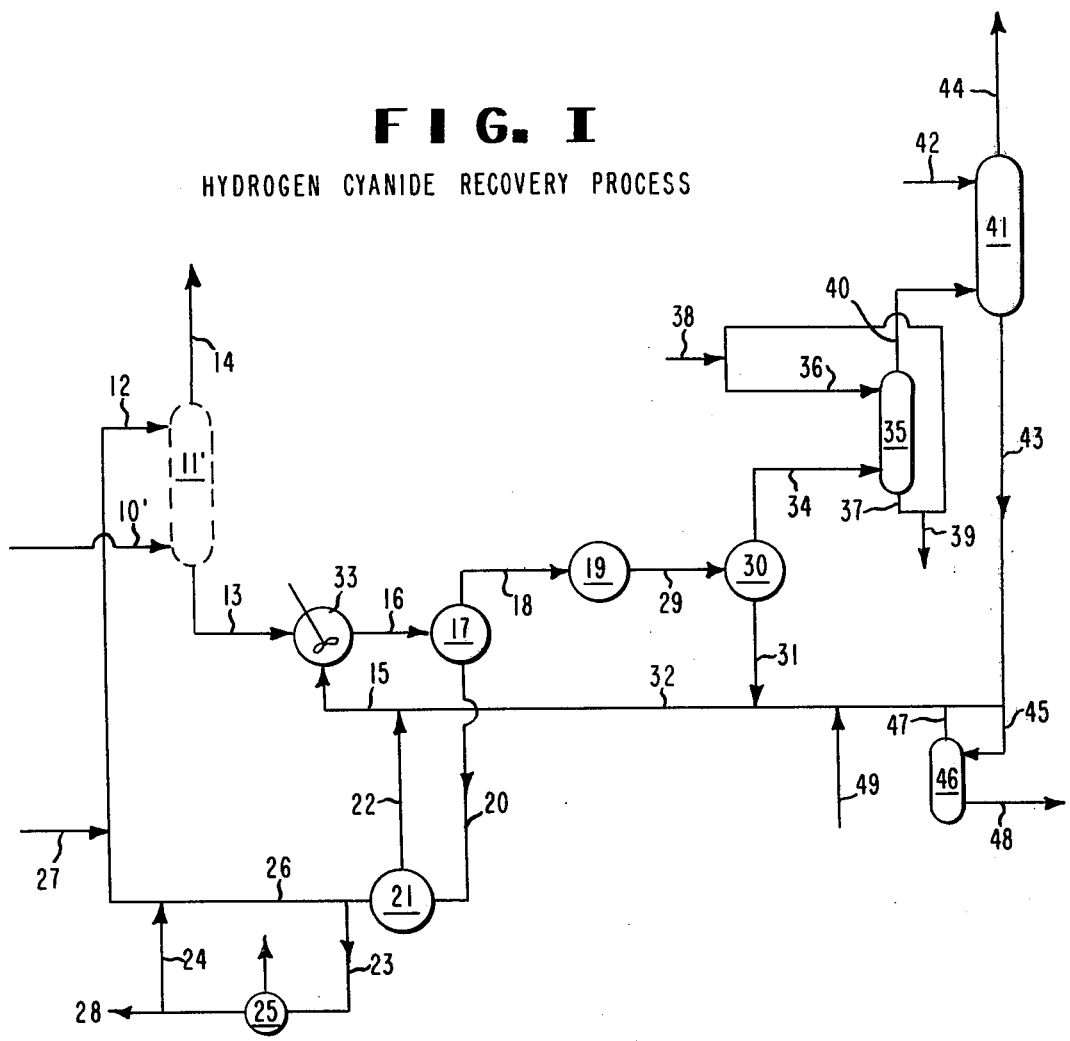
FIG. I
HYDROGEN CYANIDE RECOVERY PROCESS

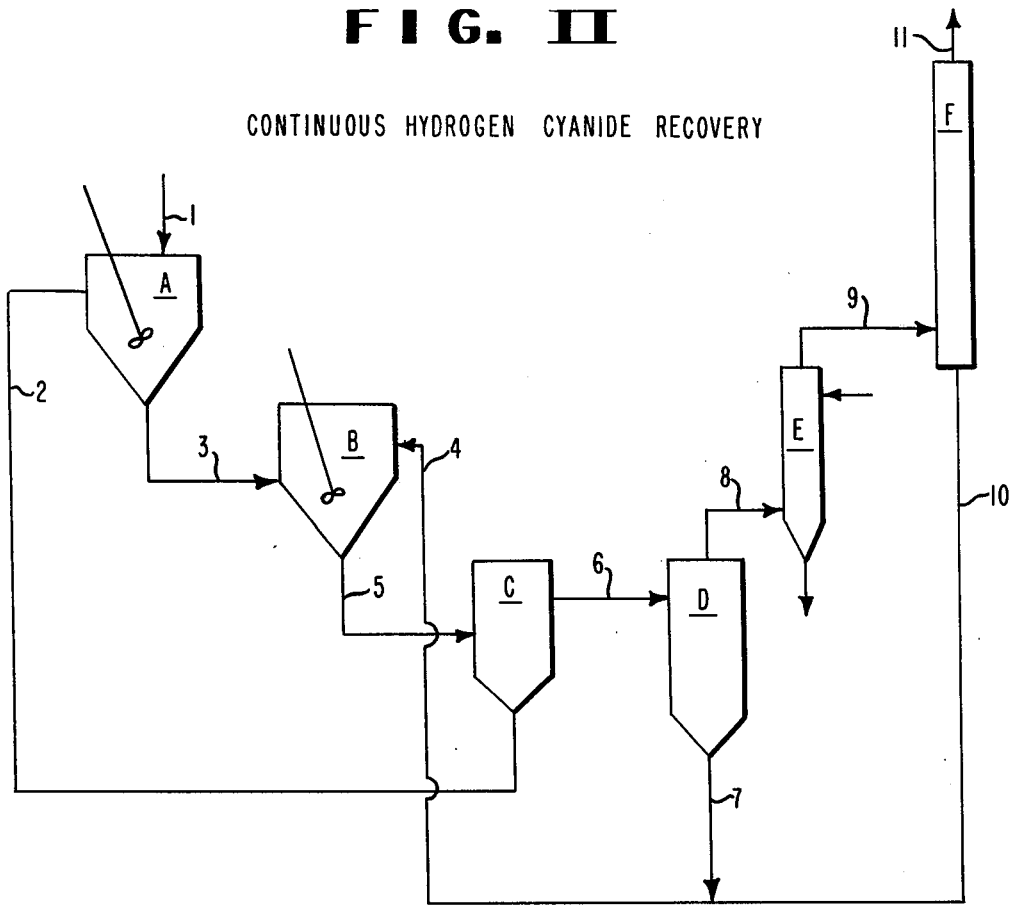
FIG. II
CONTINUOUS HYDROGEN CYANIDE RECOVERY

PROCESS FOR RECOVERY OF HYDROGEN CYANIDE

CROSS REFERENCE TO RELATED APPLICATION

This is a continuation-in-part of application Ser. No. 287,038 filed on Sept. 7, 1972 by the same inventors and now abandoned.

BACKGROUND OF THE INVENTION

It is well known to produce hydrogen cyanide particularly by the Andrussow process, U.S. Pat. No. 1,934,838, which involves essentially reaction of methane with ammonia and air over a platinum metal catalyst at an elevated temperature (about 1000°C.). In this process a mixture of products is obtained including the desired hydrogen cyanide as well as water, unreacted ammonia and methane, nitrogen, argon, hydrogen and oxides of carbon. An improvement to the Andrussow process wherein the reactants prior to reaction are mixed with steam is described in U.S. Pat. No. 3,667,907.

Such a product mixture serves as a widely used source of hydrogen cyanide especially where the hydrogen cyanide can be utilized in the form of an alkaline solution such as that of an alkali or alkaline earth metal.

For purposes wherein substantially anhydrous hydrogen cyanide is required, complicated and expensive rectification and isolation procedures have been necessary to provide a satisfactory product. Also, the more efficient utilization of hydrogen cyanide in the production of cyanohydrins such as acetone cyanohydrin, which is an important intermediate in the manufacture of methacrylate resins, has continued to be a major research objective. Accordingly, improved methods have been sought for utilizing hydrogen cyanide contained in gaseous mixtures in the preparation of ketone cyanohydrins and for providing hydrogen cyanide in substantially anhydrous form.

SUMMARY OF THE INVENTION

It has been found that ketone cyanohydrins and hydrogen cyanide in substantially anhydrous form can be produced conveniently and economically from gaseous mixtures containing hydrogen cyanide such as that obtained in the Andrussow process. The steps involve (a) treating the gaseous mixture containing hydrogen cyanide with an excess of an alkali metal carbonate dissolved in an aqueous stream to absorb the hydrogen cyanide by forming the cyanide and bicarbonate of an alkali metal. Waste gases including unused ammonia, nitrogen, hydrogen, hydrocarbons, oxides of carbon and some water are expelled from the reaction zone. Following this, the product of (a) is passed to a second reaction zone (b) wherein a ketone is introduced to form the corresponding ketone cyanohydrin and to regenerate the alkali metal carbonate.

The ketone cyanohydrin along with unreacted or excess ketone should be substantially immiscible with the aqueous phase containing the alkali metal carbonate so that it can be readily separated for recovery as the cyanohydrin or cyanohydrin-ketone mixture. Alternately, the cyanohydrin phase can be thermally decomposed (c) to regenerate the ketone and hydrogen cyanide.

The steps outlined above are illustrated in the equations to follow with sodium being represented as a typical alkali metal and methyl ethyl ketone as a typical ketone.

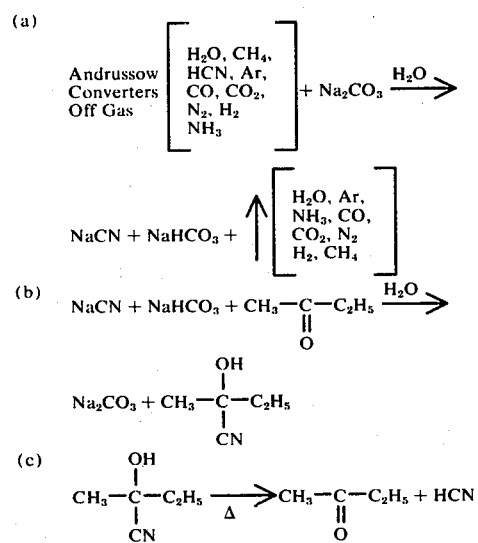

As illustrated above, the HCN contained in the gaseous products obtained from an Andrussow reactor is absorbed in an aqueous solution of an alkali metal carbonate. Aqueous carbonate solutions ranging from about 1% by weight to saturated solutions can be employed. As indicated above, it is essential that the cyanohydrin or cyanohydrin-ketone mixture produced in step (b) be substantially immiscible with the aqueous phase in order to effect ready separation of the reaction products at this stage. When the ketone is acetone, the preferred alkali metal carbonate used in step (a) is potassium carbonate, in concentrations of 25 to 45% by weight of the aqueous solution. Where ketones having more than three carbon atoms up to 15 carbon atoms are employed, the preferred alkali metal carbonates for use in step (a) are sodium or potassium carbonate in concentrations of 10 to 25% by weight. In either case the concentration of alkali metal carbonate used in step (a) is such that the cyanohydrin-ketone mixture produced in step (b) is substantially immiscible with the aqueous phase.

The mole ratio of carbonate to hydrogen cyanide should exceed unity prior to absorption and preferably should exceed unity after absorption. The pH of the absorbing solution should be above 9. Temperatures of absorption are normally maintained in the range from about 15°C. to about 150°C. with a range of 40–100°C. being preferred. Pressures can range from subatmospheric to superatmospheric. Normally the process is operated at a pressure of at least 0.5 atmosphere, and preferably in the range of 0.5–5 atmospheres.

Following the absorption step as indicated above the aqueous solution containing the alkali metal cyanide and bicarbonate as well as unconsumed carbonate is contacted with a ketone wherein a cyanohydrin or cyanohydrin-ketone mixture is produced and alkali metal carbonate is regenerated. The ketone can contain from three to 15 carbon atoms and can be aliphatic or alicyclic and may have aromatic substituents. Typical ketones include acetone, methyl ethyl ketone, methyl butyl ketone, methyl isobutyl ketone, diethyl ketone, cyclopentanone, cyclohexanone, 3-methyl cyclohexanone and cyclododecanone. Methyl ethyl ketone, cyclohexanone and 3-methyl cyclohexanone are especially preferred when the desired product is substantially anhydrous hydrogen cyanide. The amount of ketone used is normally in excess of the stoichiometric amount, the amount of excess not being critical and generally dictated by economic considerations.

The temperature of the reaction can be in the range of 10–150°C. and preferably in the range of 25°C. to 100°C. As in the absorption step, pressures can range from substmospheric to superatmospheric. Normally this step will be carried out at a pressure of at least 0.5 atmosphere with a range of 0.5–5 atmospheres being preferred. In the cyanohydrin reaction the solution containing the regenerated alkali metal carbonate after separation from the cyanohydrin phase can be recycled back to the absorption step.

Following the step of contacting the aqueous solution containing alkali metal cyanide and bicarbonate with an appropriate ketone to produce the corresponding cyanohydrin or cyanohydrin-ketone mixture, the cyanohydrin-ketone mixture can be separated from the aqueous phase and recovered by well known art methods, or if desired it can be thermally decomposed to regenerate the ketone along with hydrogen cyanide. For this step a temperature in the range of 50–160°C. is normally used together with a pressure in the range of 0.1 to 5 atmospheres. The hydrogen cyanide is normally subjected to an acid scrubbing and may be further processed if desired to yield the substantially anhydrous product. The ketone can be separated readily from the more volatile hydrogen cyanide and recycled to the process.

In addition to recovery of HCN from the well known Andrussow converters this improved process can also be used to recover HCN from other HCN processes such as that of DeGussa as well as from other gaseous streams comprising a mixture of HCN with any or all of the following: ammonia, nitrogen, hydrogen, hydrocarbons, oxygen, carbon oxides, argon, nitriles and water. The process of this invention is especially useful in providing for recovery of hydrogen cyanide in the form of highly valuable cyanohydrin intermediates for the synthesis of the commercially important methacrylate resins and also for recovery in substantially anhydrous form of hydrogen cyanide, useful in commercial syntheses such as hydrocyanation of olefins.

DESCRIPTION OF PREFERRED EMBODIMENTS

Operation of the process of this invention is illustrated diagramatically in FIGURE I attached hereto and which forms a part of the specification.

As mentioned above, the preferred alkali metal carbonate is that of sodium or potassium. Preferred ketones for use in the process are acetone, methyl ethyl ketone, cyclohexanone and 3-methyl cyclohexanone. In the general process described below sodium carbonate is illustrated, it being understood that other alkali metal carbonates can be also used as illustrated in the examples. Similarly, ketones other than those indicated to be preferred can be used.

With reference to FIGURE I, hydrogen cyanide, optionally produced by the reaction of ammonia, methane and oxygen, as in the Andrussow process over a platinum metal catalyst at an elevated temperature (about 1000°C.) in a gaseous stream comprised of ammonia, hydrogen, methane, carbon oxides, oxygen, nitrogen, argon and water is fed through line 10' near the bottom of an absorber column 11' preferably operated at a pressure of 0.5–3 atmospheres. Into the top of the column is fed through line 12 aqueous sodium carbonate, optionally containing sodium cyanide and sodium bicarbonate, which reacts with the HCN to form sodium cyanide and sodium bicarbonate. The waste gases, i.e., all of the incoming gases minus the absorbed hydrogen cyanide and any small amount of ammonia and carbon dioxide which might have been co-absorbed, pass through column 11' and leave through line 14 and are subsequently burned or optionally processed to recover $NH_3$.

The aqueous sodium cyanide, sodium bicarbonate and sodium carbonate solution is fed through line 13 into the cyanohydrin formation reactor 33 where it is mixed with a ketone, e.g., methyl ethyl ketone, capable of forming a cyanohydrin fed in through line 15. The reactor preferably is operated at 25–100°C. and 0.5–3 atmospheres pressure with a holdup time of ketone and aqueous material in the reactor of 0.1–20 minutes and it may be multistaged. A portion of the ketone reacts with the sodium cyanide and sodium bicarbonate present in the aqueous phase to form the ketone cyanohydrin. The aqueous carbonate-cyanohydrin mixture leaves the reactor through line 16 and is fed to the decanter 17 where the cyanohydrin and aqueous phases are separated. The decanter is preferably operated at 25–100°C. and 0.5–3 atmospheres pressure with an average holdup time of organic and aqueous of 1–20 minutes. Optionally, the reaction-decantation can be made to occur in the same vessel.

The cyanohydrin phase is removed from the decanter through line 18 and stored in 19. The aqueous phase from the decanter is removed through line 20, any dissolved ketone being flashed from it at 10–760 Torr in a ketone flasher 21 and the ketone returned to the cyanohydrin reactor through lines 22 and 15. Water is removed from the aqueous recycle stream (ketone flasher tails) in a purge evaporator 25 by withdrawing a side stream through line 23 and returning the salt concentrate from which the water has been removed through line 24 to the main aqueous material going to the absorber through line 26. Makeup sodium carbonate or caustic is added to the aqueous loop as needed through line 27. By-products are purged as needed through line 28.

The cyanohydrin containing stream held in cyanohydrin storage 19 can be withdrawn for recovery of the cyanohydrin or it can be passed on demand via line 29 to the cracker 30 where it is heated to temperatures from 50–150°C. and under pressures from 0.1–5 atmospheres with holdup times from one second to ten minutes so that the cyanohydrin partially or totally dissociates and vaporizes into ketone and free HCN. The tails from the cracker are removed through line 31, mixed with the tails from the distillation column 41 in line 32 and finally mixed with the ketone removed from the aqueous loop in line 15 and returned to the cyanohydrin reactor 33. Optionally, these recycle ketone streams can be stored before return to the cyanohydrin reactor. The HCN containing gas which distills out overhead in the cracker is passed without condensation through line 34 to the acid scrubber 35 where the HCN containing gas is contacted with an acid or acidic salt dissolved in water without condensation to remove traces of volatile basic materials formed in the cracker or in the cracker feed. Any acid or acid salt other than those formed by weak acids can be used in the washing operation. Examples are sulfuric acid or sodium hydrogen sulfate in the range of 7–70 weight percent dissolved in water. The acid washing system is operated at 25–100°C. under a pressure from 0.1–5 atmospheres. Scrubber acid solution enters the acid scrubber near the top through line 36 and leaves through line 37 near the bottom of the scrubber. Acid makeup may be added to the acid loop through line 38 and spent acid will be purged as needed through line 39. The acid stabilized HCN containing gas is removed from the acid scrubber near the top through line 40 and can be passed without condensation to the HCN enricher column 41. Trace acid, 0.1–100 ppm acid per part HCN fed to the enricher column, is fed through line 42 in the middle or at the top of the HCN enricher 41 to stabilize the HCN. The enricher should be of such a design as to allow separation of HCN from ketone and water fed to the column. The tails of the enricher contain mostly ketone, water and residual ketone cyanohydrin and are passed through line 43 and are recycled to the cyanohydrin reactor. The overhead from the enricher is substantially anhydrous HCN. It is removed from the enricher after condensation through line 44 and can be used immediately or optionally acid stabilized and stored until needed. The enricher itself can be multistaged distillation.

A small portion of the organic ketone loop is purged through line 45 and sent to a purge evaporator 46 where ketone is recovered and recycled to the ketone loop through line 47. The tails from the purge evaporator are purged through line 48. Makeup ketone can be added as needed to the organic loop through line 49.

The examples to follow illustrate the various steps of the process of this invention. Temperatures in examples 1–5 ranged from 25°–30°C. unless specified differently.

EXAMPLE 1

Reaction of NaCN and NaHCO$_3$ (excess Na$_2$CO$_3$ present) with Methyl Ethyl Ketone (MEK) to Form Methyl Ethyl Ketone Cyanohydrin and Na$_2$CO$_3$ Sodium carbonate (Na$_2$CO$_3$, 42.7 g., 0.403 mole), sodium bicarbonate (NaHCO$_3$, 17.0 g., 0.202 mole) and sodium cyanide (NaCN, 10.0 g., 0.204 mole) were dissolved in 254 g. of water to form a solution containing 13.21 weight percent Na$_2$CO$_3$, 5.26 weight percent NaHCO$_3$ and 3.09 weight percent NaCN. Wet methyl ethyl ketone (47.8 g. of a solution containing 10 weight percent water, 43.0 g. MEK, 0.598 mole) was added to the aqueous solution and the two phases were mixed for 25 minutes and then allowed to separate. The aqueous phase (321.2 g.) was analyzed for NaCN and found to contain 0.90 weight percent (2.89 g., 0.059 mole). The organic phase (47.6 g.) contained 29.8 weight percent methyl-ethyl ketone cyanohydrin (MEK-HCN, 14.18 g., 0.143 mole) and a trace of free HCN. Total cyanide accounted for was 99% with 29% in the aqueous phase as NaCN and 70% in the organic phase as cyanohydrin. The weight percent other salts besides NaCN present in the aqueous phase after the reaction were 17.90 weight percent Na$_2$CO$_3$ and 1.54 weight percent NaHCO$_3$.

EXAMPLE 2

Production of Cyclohexanone Cyanohydrin

Sodium carbonate (30.0 g., 0.283 mole) was dissolved in 200.2 g. of water, the system was closed and anhydrous liquid HCN (3.46 g., 0.128 mole) was added to the solution. Little, if any, heat was given off in the reaction and the product solution was clear. Cyclohexanone (32.05 g., 0.327 mole) was injected into the system with good mixing. The mixture heated up immediately 10°C. The organic and aqueous phases were mixed for 15 minutes longer and then allowed to separate. The organic layer (35.9 g.) was analyzed for free HCN, showing none, followed by an analysis for both combined and free HCN which showed 3.19 g. (0.118 mole) or 92% of the original HCN injected appearing in the organic phase as cyanohydrin.

EXAMPLE 3

Production of Cyclohexanone Cyanohydrin — Use of Potassium Carbonate

Potassium carbonate (121.7 g., 0.882 mole) was dissolved in 100 g. of water, the system was closed and liquid anhydrous HCN (7.12 g., 0.264 mole) was injected into the system which was stirred for several minutes after injection. Some solid was noticed suspended in the aqueous phase after this time. Cyclohexanone (45.5 g., 0.464 mole) was then injected into the system, the phases were mixed for several minutes and then allowed to separate. The aqueous phase no longer contained solids and weighed 218.5 g. The organic layer (51.32 g.) was analyzed for free HCN and showed none. Analysis of the organic layer for total HCN, both combined and free, gave 5.37 g. (0.199 mole) or 75.5% of the initial HCN injected into the carbonate and recovered as cyclohexanone cyanohydrin.

EXAMPLE 4

Production of 3-Methylcyclohexanone Cyanohydrin

Sodium carbonate (400 g., 3.77 moles) was dissolved in 1600 g. of water to make a 20 weight percent sodium carbonate solution, the system was closed and anhydrous liquid HCN (21 g., 0.778 mole) was then injected into the solution which was then stirred for several minutes. 3-Methylcyclohexanone (255.4 g., 2.28 moles) was added to the aqueous solution and mixed with an immediate temperature rise being noted in the solution. The organic and aqueous mixture was allowed to stir for five minutes and then allowed to separate overnight into an organic and aqueous phase. The aqueous phase (1981.3 g.) was analyzed for weight percent NaCN giving 0.26 weight percent (5.08 g., 0.104 mole). The organic phase (281.4 g.) was analyzed for total HCN as cyanohydrin and free HCN giving 0.675 moles of HCN present. Analysis for free HCN in the organic phase showed none to be present. Total HCN accounted for was 100% with 13% in the aqueous phase and 87% in the organic.

EXAMPLE 5

Production of Cyanohydrin from Methyl Ethyl Ketone

Sodium carbonate (118.6 g., 1.117 mole) was dissolved in 406.9 g. of water, the system was closed and 17.90 g. of 99% liquid HCN was added (17.72 g. HCN, 0.656 mole). Methyl ethyl ketone (75.2 g., 1.043 mole) was added, the aqueous and organic phases were stirred for one hour, then heated at ~80°C. for 30 minutes and let stand overnight. The aqueous and organic layers were separated; the aqueous layer weighed 509.8 g.; the organic layer weighed 96.6 g. Analysis of the organic layer for total HCN, both combined and free, showed 13.5 g. of HCN (0.50 mole). Subsequent analysis for free HCN showed 0.66 g. to be present in the organic layer. Seventy-six percent of the total HCN originally injected into the aqueous phase was recovered in the organic phase as free and combined HCN.

EXAMPLE 6

Comparison — Reaction of Sodium Cyanide Solution (NaCN) with Methyl Ethyl Ketone (MEK)

Sodium cyanide (19.79 g., 0.404 mole) was dissolved in 102.2 g. of water making 16.2 weight percent NaCN solution at 25°C. Wet MEK (100.18 g. containing 10 weight percent $H_2O$, 91.7 g. of MEK, 1.27 mole) was mixed with the aqueous phase for 25 minutes, then allowed to separate. The aqueous phase weighed 138 g., the organic 82.3 g. Analysis of the organic phase for total HCN, both combined and free, showed 0.71 g. HCN (0.0264 mole) equivalent to 3.17 weight percent MEK.HCN. Analysis for free HCN in the organic layer showed none to be present. The percent of the original NaCN present in the aqueous phase transferred to the organic phase was 6.5%.

EXAMPLE 7

Semicontinuous Decomposition (Cracking) of Methyl Ethyl Ketone Cyanohydrin

Two reactors with water jackets connected in series to the same hot water source were connected together in such a way that the off-gas from the first one could be sparged into a liquid in the second one without condensation of the gas, after which the washed gas was condensed exit the second reactor in a Dry Ice trap. Sodium hydrogen sulfate monohydrate (120 g.) along with 33 g. of water was added to the second reactor. A mixture of methyl ethyl ketone and methyl ethyl ketone cyanohydrin (334.6 g. containing 53 weight percent methyl ethyl ketone cyanohydrin, 177.4 g., 1.793 moles) was added to the first reactor and both the first and second reactor were heated to 82°C. at which point vigorous boiling took place in the first reactor and the gas bubbled through the second reactor. After two hours, 60.2 g. of liquid was removed from the Dry Ice trap. Analysis of this liquid for free HCN showed 12.6 weight percent (7.57 g., 0.28 mole) and for total HCN, both combined and free, showed 14.1 weight percent (8.5 g. HCN total, 0.315 mole). While the above overhead sample was collected, 127 g. of tails was taken from the cracker (with no new addition of cyanohydrin to the cracker). Analysis of these tails for total HCN showed 13.8 weight percent, while analysis for free HCN showed 0.43 weight percent to be present. The composition of HCN in the overhead from the cracker at the above feed cyano-hydrin composition was almost exactly that of the feed cyanohydrin indicating substantial stabilization of HCN formed in the cracker by the above acidic washing technique.

EXAMPLE 8

Cracking of Cyclohexanone Cyanohydrin

Cyclohexanone containing cyclohexanone cyanohydrin (290.74 g. which contained 24.6 weight percent cyclohexanone cyanohydrin, 71.6 g.) was added to a 500 cc. still pot equipped with a thermometer and one foot long, ½ in. diameter glass distillation column packed with glass helices equipped with a micro condenser and take off with a Dry Ice cold trap to catch HCN. A catalytic amount of sodium cyanide (0.05 g.), was added to the pot and the pot containing cyanohydrin was heated to 154°C. at which point the pot contents boiled. HCN distilled out overhead in the still head at 26°C. Cracking (distillation) was continued for 1.5 hours after which time the pot was cooled down. The overhead condensat was 7.3 g. of "free" HCN (0.270 mole). Analysis of the pot contents (281 g.) showed 7.54 g. of HCN still present (0.280 mole).

EXAMPLE 9

Continuous Run

To demonstrate the operation of the process in a continuous manner, the following flows were conducted in a system as outlined in FIGURE II. To a one-liter stirred reactor (A) were fed, via line 2, 80 cc/min. of aqueous solution containing 1.2% sodium cyanide, 16.1% sodium carbonate and 2.0% sodium bicarbonate. Also fed via line 1 to (A) was 0.75 g/min. of liquid HCN. The product stream then flowed from (A) to reactor (B) via line 3 at essentially the same rate (80 cc/min.). Also fed to (B) via line 4 was 36 cc/min. of a stream containing 63.1% methyl ethyl ketone, 27% methyl ethyl ketone cyanohydrin and 9.9% $H_2O$. Holdup time in reactor (B) was 12 minutes. The mixed phases exit (B) entered decanter (C) via line 5 where the two phases were allowed to separate. The heavier aqueous phase exited via line 2 and was recycled to (A). The compositions indicated above were the equilibrium values obtained after charging the system with approximately the same compositions and running for 4 hours. The lighter oil phase left the decanter via line 6 and entered a cracker (D). The cracker was heated to 80°–85°C. so as to permit a tails flow (line 7) of 15.5 cc/min., the remainder being vaporized overhead. Tails composition was 38% methyl ethyl ketone cyanohydrin, 8.0% $H_2O$, and 54% methyl ethyl ketone. The vapor was passed via line 8 through a sieve plate scrubber (E) wherein an aqueous solution of sodium bisulfate introduced via line 12 and drawn off via line 13 was used to remove traces of base. The scrubbed vapor entered a 20 plate distillation column (F) via line 9, and HCN was taken overhead via line 11 at a rate of 0.5 g/min. The tails from the column (line 10) were combined with that from line 7 and recycled to reactor (B) via line 4. The system was operated in this manner for 4.75 hours, during which time a total of 214 g. of HCN were added to the system. A total of 175 g. were recovered overhead from the distillation column. Concentration of methyl ethyl ketone cyanohydrin increased by 5% in the 2800 g. inventory of organic phase, amounting to 38 g. HCN and closing the material balance.

EXAMPLE 10

Production of Cyanohydrin from Acetone

Potassium carbonate (80.0 g., 0.579 mole) was dissolved in 120.0 g. of water, the system was closed and about 10.0 cc. of 99% liquid HCN was added (6.93 g., 0.257 mole), the mixture was equilibrated at 50°C. and then 29.0 g. of 99.5% acetone (0.544 mole, containing 0.5% $H_2O$) was added. The phases were mixed for 15 minutes at 50°C. and were then separated; the aqueous layer weighed 200 g; the organic layer weighed 34 g. Analysis of the organic layer for HCN, as acetone cyanohydrin, showed that 45% of the total HCN originally injected into the aqueous phase was recovered in the organic phase as cyanohydrin.

EXAMPLE 11

Continuous Run

To demonstrate further the operation of the recovery portion of the process in a continuous manner, particularly with use of acetone in the cyanohydrin producing step, the following flows were conducted in a system as outlined in FIG. II. To a one-liter stirred reactor (A) were fed, via line 2, 56 g/min. of aqueous solution containing 2.9% potassium cyanide, 33.9% potassium carbonate and 4.4% potassium bicarbonate. Also fed via line 1 to (A) was 0.63 g/min. of liquid HCN to simulate absorption from HCN synthesis gas in a commercial process. The product stream then flowed from (A) to a reactor (B) via line 3 at 56.6 g/min. Also fed to (B) via line 4 was 31.8 g/min. of a stream containing 56.5% acetone, 25.4% acetone cyanohydrin and 18.1% $H_2O$. Holdup time in reactor (B) was 12 minutes. The mixed phases exit (B) entered decanter (C) via line 5 where the two phases were allowed to separate. The heavier aqueous phase exited via line 2 and was recycled to (A). The compositions indicated above were the equilibrium values obtained after charging the system with approximately the same compositions and running for four hours. The lighter oil phase left the decanter via line 6 at 32.4 g/min. It contained 31% acetone cyanonydrin for a net production rate of 1.98 g/min. of acetone cyanohydrin.

When it was desired to recover pure HCN, the oil phase was passed via line 6 to a cracker (D). The cracker was heated to 80°–85°C. so as to permit a tails flow (line 7) of 16.2 g/min., the remainder being vaporized overhead. Tails composition was 32.2% acetone cyanohydrin, 22.7% water and 45.1% acetone. The vapor was passed via line 8 through a sieve plate scrubber (E) whereby an aqueous solution of sodium bisulfate was used to remove traces of base. The scrubbed vapor entered a 20 plate distillation column (F) via line 9, and HCN was taken overhead at a rate of 0.63 g/min.

The tails from column (F) were combined via line 10 with that from line 7 and recycled to reactor (B) via line 4. The system was operated in this manner for 3.5 hours. Alternately, the oil phase could be withdrawn from (C) for recovery of the acetone cyanohydrin.

We claim:

1. A process for recovery of hydrogen cyanide contained in a gaseous mixture which comprises (a) treating the gaseous mixture with an aqueous solution of analkali metal carbonate, at a pH of at least 9.0 and at a temperature in the range of about 15°C. to about 150°C. and under a pressure in the range 0.5 to 5.0 atmospheres to absorb hydrogen cyanide and to produce an aqueous product solution containing alkali metal cyanide and alkali metal bicarbonate while expelling nonabsorbed gases from the product solution; (b) contacting the aqueous product solution from (a) with a ketone containing from three to fifteen carbon atoms at a temperature in the range of 25°–100°C. under a pressure in the range 0.5 to 5.0 atmospheres to produce a cyanohydrin-ketone mixture and to regenerate in aqueous solution the alkali metal carbonate, the concentration of alkali metal carbonate in the aqueous solution in step (a) being about 10–45% by weight such that the cyanohydrin-ketone mixture produced in step (b) is substantially immiscible with the aqueous solution containing the regenerated alkali metal carbonate; (c) separating the aqueous alkali metal carbonate solution from the cyanohydrin-ketone mixture; (d) recycling the carbonate solution to the gas absorption step (a); recovering the cyanohydrin-ketone mixture (e) and subjecting said cyanohydrin - ketone mixture to a temperature in the range of 50 – 160°C and under a pressure of 0.1 to 5 atmospheres to regenerate the corresponding ketone and hydrogen cyanide from the cyanohydrin and recovering the hydrogen cyanide and ketone.

2. The process of claim 1 wherein the gaseous mixture is treated in step (a) with an aqueous solution containing from 25–45% by weight of potassium carbonate and having a pH of at least 9.0, and the resulting product solution is contacted in step (b) with acetone to produce the corresponding cyanohydrin-acetone mixture.

3. The process of claim 1 wherein the ketone in step (b) is of the group consisting of methyl ethyl ketone, cyclohexanone and 3-methylcyclohexanone and the alkali metal carbonate is of the group consisting of sodium carbonate and potassium carbonate.

4. The process of claim 3 wherein the gaseous mixture containing hydrogen cyanide in step (a) is obtained from reaction of ammonia, methane and oxygen over a platinum metal catalyst at an elevated temperature.

5. The process of claim 2 wherein the gaseous mixture containing hydrogen cyanide in step (a) is obtained from reaction of ammonia, methane and oxygen over a platinum metal catalyst at an elevated temperature.

6. The process of claim 2 wherein the hydrogen cyanide and ketone generated from cracking of the cyanohydrin in step (e) are subjected to an acid scrubbing and thereafter are distilled to provide substantially anhydrous hydrogen cyanide and the corresponding ketone from the cyanohydrin.

7. The process of claim 2 wherein the cyanohydrin-acetone mixture obtained in step (b) is subjected in step (e) to a temperature in the range of 50°–160°C. and under a pressure of 0.1 to 5 atmospheres to regenerate the acetone and hydrogen cyanide from the cyanohydrin and recovering the hydrogen cyanide and acetone.

\* \* \* \* \*